United States Patent
Chen et al.

(10) Patent No.: US 9,420,330 B2
(45) Date of Patent: Aug. 16, 2016

(54) METHOD FOR PRESENTING CUSTOM CONTENT IN SET TOP BOX AND SET TOP BOX

(71) Applicant: Huawei Technologies Co., Ltd.

(72) Inventors: Hanbing Chen, Shenzhen (CN); Yi Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 362 days.

(21) Appl. No.: 14/081,657

(22) Filed: Nov. 15, 2013

(65) Prior Publication Data

US 2014/0082687 A1   Mar. 20, 2014

Related U.S. Application Data

(63) Continuation of application No. PCT/CN2011/082962, filed on Nov. 25, 2011.

(51) Int. Cl.

| H04N 7/173 | (2011.01) |
|---|---|
| H04N 21/426 | (2011.01) |
| H04N 21/431 | (2011.01) |
| H04N 21/443 | (2011.01) |
| H04N 21/81 | (2011.01) |

(Continued)

(52) U.S. Cl.
CPC ....... *H04N 21/42692* (2013.01); *H04N 21/431* (2013.01); *H04N 21/4432* (2013.01); *H04N 21/6175* (2013.01); *H04N 21/6334* (2013.01); *H04N 21/64322* (2013.01); *H04N 21/8153* (2013.01)

(58) Field of Classification Search
CPC .......... H04N 21/42692; H04N 21/431; H04N 21/4432; H04N 21/6175; H04N 21/6334; H04N 21/64322; H04N 21/8153; G06F 9/445
See application file for complete search history.

(56) References Cited

U.S. PATENT DOCUMENTS

| 6,711,743 B1 * | 3/2004 | Hong et al. | 725/111 |
|---|---|---|---|
| 2003/0038177 A1 * | 2/2003 | Morrow | 235/441 |

(Continued)

FOREIGN PATENT DOCUMENTS

| CN | 1455595 A | 11/2003 |
|---|---|---|
| CN | 101436143 A | 5/2009 |

(Continued)

OTHER PUBLICATIONS

International Search Report received in Application No. PCT/CN2011/082962, mailed Sep. 2, 2012, 11 pages.

*Primary Examiner* — Oleg Asanbayev
(74) *Attorney, Agent, or Firm* — Slater Matsil, LLP

(57) ABSTRACT

A method for presenting a custom content in a set top box and a set top box are disclosed. The method includes checking a display cache and a flash memory of a set top box after the set top box is powered on, writing a custom content in the flash memory into the display cache if the display cache and the flash memory of the set top box are checked correct, controlling the custom content written into the display cache to be presented to a user on a video terminal, and, after the custom content written into the display cache is controlled to be presented to the user on the video terminal, checking a hardware device other than the display cache and the flash memory in the set top box, starting an operating system of the set top box, and performing network authentication.

8 Claims, 1 Drawing Sheet

(51) Int. Cl.
*H04N 21/61* (2011.01)
*H04N 21/6334* (2011.01)
*H04N 21/643* (2011.01)

(56) References Cited

U.S. PATENT DOCUMENTS

2006/0095935 A1* 5/2006 Ooi et al. .......................... 725/25
2006/0159117 A1* 7/2006 Furlong et al. ................. 370/432
2007/0097860 A1* 5/2007 Rys et al. ...................... 370/229
2008/0244250 A1* 10/2008 Swanson et al. .................. 713/1
2010/0054707 A1 3/2010 Karaoguz et al.
2011/0078732 A1* 3/2011 Hutohison ...................... 725/39
2012/0240192 A1* 9/2012 Orazi et al. ...................... 726/4
2012/0317349 A1* 12/2012 Tonami ........................ 711/103

FOREIGN PATENT DOCUMENTS

| | | |
|---|---|---|
| CN | 101489026 A | 7/2009 |
| CN | 101710969 A | 5/2010 |
| CN | 101980522 A | 2/2011 |

\* cited by examiner

METHOD FOR PRESENTING CUSTOM CONTENT IN SET TOP BOX AND SET TOP BOX

This application is a continuation of International Application No. PCT/CN2011/082962, filed on 25 Nov. 2011, which is hereby incorporated by reference herein in its entirety.

TECHNICAL FIELD

Embodiments of the present invention relate to the field of digital television technologies, and in particular, to a method for presenting a custom content in a set top box and a set top box.

BACKGROUND

In Internet Protocol television (IPTV) and cable television (Cable TV) services, upon power-on of a set top box, a startup process of the set top box can actually be divided into two different stages. The first stage is self check and startup of the set top box hardware device, startup of an operating system, and network authentication, which generally take 10 to 15 seconds, and in this process, a television screen connected with the set top box is generally blank or displays a hardware check interface of the set top box. The second stage is that middleware of the set top box begins to start up after completion of the self check of the set top box hardware, the startup of the operating system, and the network authentication, where the loading and startup of the set top box middleware takes about 15 to 20 seconds.

Before the set top box is started up, a network operator generally presents a custom content to the user, for example, using the time to insert an advertisement so as to avoid boring waiting of a user, which enhances user experience and increases revenues of the network operator. At present, existing custom content presentation technologies are mostly implemented after the set top box middleware is loaded and started up, that is, after the self check of the set top box hardware device is complete, the operating system is started up, and the network authentication is successful. After the set top box middleware is loaded and started up, the middleware is used to present the custom content to the user. However, after the power-on of the set top box, the self check of the hardware, the startup of the operating system, and the network authentication, it is still necessary to start up the middleware. By then, a delay of about 30 seconds has already been incurred. That is to say, after the user powers on the set top box, the waiting time is generally at least about 30 seconds before the custom content begins to be presented. From the startup of the set top box to the end of custom content presentation (it generally takes 15 to 20 seconds to present the custom content), that is, from when the user powers on the set top box to when the user is able to watch a television program and select a channel, it generally takes about 50 seconds, which leads to a long waiting time of the user and deteriorates the user experience.

SUMMARY OF THE INVENTION

Embodiments of the present invention provide a method for presenting a custom content in a set top box and a set top box, so as to shorten the waiting time before a user can select a channel after power-on of the set top box, without reducing the presentation time of the custom content.

In one aspect, an embodiment of the present invention provides a method for presenting a custom content in a set top box, including checking a display cache and a flash memory of a set top box after the set top box is powered on, writing a custom content in the flash memory into the display cache if the display cache and the flash memory of the set top box are checked correct, controlling the custom content written into the display cache to be presented to a user on a video terminal, and after the custom content written into the display cache is controlled to be presented to the user on the video terminal, checking a hardware device other than the display cache and the flash memory in the set top box, starting an operating system of the set top box, and performing network authentication.

In another aspect, an embodiment of the present invention provides a set top box, including a checking unit, configured to check a display cache and a flash memory of a set top box after the set top box is powered on, a writing unit, configured to write a custom content in the flash memory into the display cache if the display cache and the flash memory of the set top box are checked correct, a presentation controlling unit, configured to control the custom content written into the display cache to be presented to a user on a video terminal, and a loading unit, configured to, after the custom content written into the display cache is controlled to be presented to the user on the video terminal, check a hardware device other than the display cache and the flash memory in the set top box, start an operating system of the set top box, and perform network authentication.

As can be seen from the foregoing technical solutions, the embodiments of the present invention have the following advantages. In the embodiments of the present invention, after the set top box is powered on, the display cache and the flash memory of the set top box are checked. If the display cache and the flash memory of the set top box are checked correct, the custom content in the flash memory is written into the display cache, and the custom content written into the display cache is controlled to be presented to the user on the video terminal. Then the hardware device other than the display cache and the flash memory in the set top box is checked, the operating system of the set top box is started up, and network authentication is performed. In the embodiments of the present invention, after the display cache and the flash memory of the set top box are checked, the custom content is written into the display cache, and the custom content in the local flash memory is presented to the user. Therefore, the custom content can be presented to the user through the display cache without waiting for self check of a hardware device other than the display cache and the flash memory, startup of the operating system, network authentication, and loading and startup of the middleware. Compared with the prior art, on the condition that the presentation time of the custom content is the same, the method in the embodiments of the present invention can reduce the delay by about 30 seconds, shorten the waiting time before a user can select a channel after power-on of the set top box, and improve user experience.

DETAILED DESCRIPTION OF ILLUSTRATIVE EMBODIMENTS

Embodiments of the present invention provide a method for presenting a custom content in a set top box and a set top box, so as to shorten the waiting time before a user can select a channel after power-on of the set top box, and improve user experience without reducing the presentation time of the custom content.

To make the objectives, features, and advantages of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person skilled in the art based on the embodiments of the present invention shall fall within the protection scope of the present invention.

Figure 1:
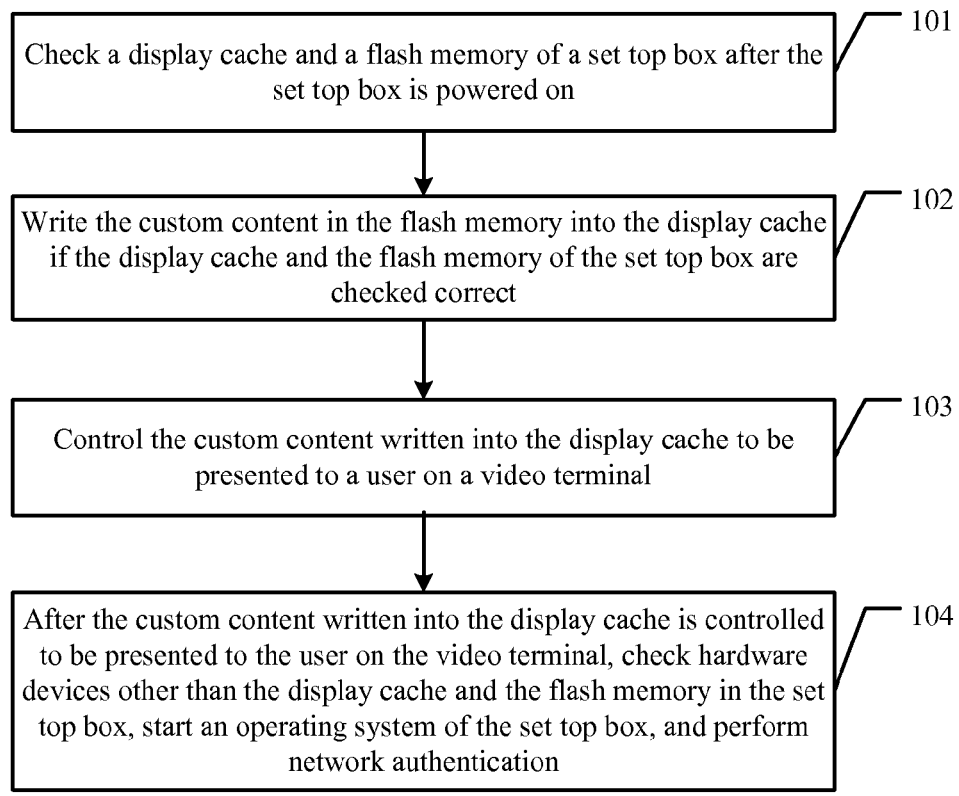
FIG. 1 is a schematic diagram of an embodiment of a method for presenting a custom content in a set top box according to the present invention.

As shown in FIG. 1, an embodiment of a method for presenting a custom content in a set top box according to the present invention includes the following steps.

101. Check a display cache and a flash memory of a set top box after the set top box is powered on.

In the embodiment of the present invention, after the set top box is powered on, the display cache and flash memory of the set top box need to be checked first to ensure correct configuration of the two hardware devices, that is, the display cache and the flash memory. If the display cache and the flash memory of the set top box are checked correct, step 102 is executed. The present invention differs from the prior art in that, in the prior art, after the set top box is powered on, all hardware devices are checked to ensure correct configuration; in the embodiment of the present invention, after the set top box is powered on, only the display cache and the flash memory are checked first.

Before the set top box is delivered from a factory, a default startup display file such as a logo of a manufacturer of the set top box is stored in a fixed address range of a local flash memory of the set top box. After the set top box is powered on, in the embodiment of the present invention, the set top box reads initialization information of the display cache and the flash memory, that is, the set top box performs a self check process of the two hardware devices, that is, the display cache and the flash memory. The initialization information has been configured before delivery of the set top box. The reading of the initialization information of the display cache and the flash memory is primarily intended to check whether the two hardware devices of the set top box, that is, the display cache and the flash memory, are configured normally. It should be noted that, in the embodiment of the present invention, the actions in the embodiment shown in FIG. 1 are executed by the set top box, or a device configured inside the set top box and used to present the custom content to the user. The description herein is only exemplary and shall not be construed as a limitation.

102. Write the custom content in the flash memory into the display cache if the display cache and the flash memory of the set top box are checked correct.

In the embodiment of the present invention, as can be known from the check in step 101, if the display cache and the flash memory of the set top box are checked correct, the set top box writes the custom content into the display cache directly.

It should be noted that, after the set top box reads the initialization information of the display cache and the flash memory, according to the requirement of the initialization information, the set top box begins to read binary data from a specified storage address of the local flash memory, and writes the read binary data into the display cache. In this way, a display screen of a video terminal (such as a television set) can present the corresponding image content. In the embodiment of the present invention, the display cache is a cache that presents a startup display file in the set top box to the user directly. The content in the display cache comes from data in the fixed address range stored in the local flash memory, and the custom content stored in the display cache is binary data. For example, the Logo of the manufacturer of the set top box is stored in the display cache. The display cache displays the data in the display cache to the user without requiring startup of an operating system of the set top box, network authentication, and startup and loading of middleware. The custom content can be presented to the user directly, as long as the custom content is written into the display cache after the display cache and the flash memory of the set top box are initialized. In the embodiment of the present invention, the custom content in the local flash memory is written into the display cache directly, which can reduce the time when the user waits for the startup of the operating system of the set top box, the network authentication, and the startup and loading of the middleware, and improve user experience.

It should be noted that in the embodiment of the present invention, the writing the custom content in the flash memory into the display cache may specifically include the following steps: determining whether the custom content in the local flash memory is in a preset file format, and, if yes, writing the custom content into the display cache directly, or, if not, reading the custom content into decoding hardware so that the decoding hardware decodes the custom content, and then writing the decoded custom content into the display cache.

In the embodiment of the present invention, after being powered on, the set top box checks the display cache and the flash memory of the set top box, and determines whether the custom content in the local flash memory of the set top box is in the preset file format. It should be noted that the custom content may be an advertisement file that needs to be presented to the user, for example, a video advertisement, an image advertisement, and so on, or may be a poster file in other forms, which is not limited in the embodiment of the present invention. The local flash memory of the set top box refers to a storage medium of the set top box, and the custom content is pre-stored in the local flash memory of the set top box and is to be presented to the user after the set top box is started up. For example, a network operator may pre-store product introductions of enterprises into the local flash memory of the set top box in a picture form so that the set top box invokes them from the local flash memory after reading the initialization information.

It should be noted that, in the embodiment of the present invention, after being powered on, the set top box checks the display cache and the flash memory of the set top box, and then determines whether the locally stored custom content is in the preset file format, which is different from the prior art where the startup of the operating system and the network authentication begin right after the initialization information is read (all hardware devices are checked).

It should be noted that, the preset file format in the embodiment of the present invention is a file format that can be directly identified by the display cache of the set top box. For example, generally, the display cache of the set top box can identify a file of a bitmap (BMP) format. In practical application, a file format that the display cache of the set top box can directly identify may be other file formats. The description herein is only exemplary and shall not be construed as a limitation.

In the embodiment of the present invention, if the custom content in the local flash memory of the set top box is in the preset file format, that is, if the custom content in the local flash memory of the set top box can be directly identified by the display cache, the set top box writes the custom content into the display cache directly.

It should be noted that, after the set top box reads the initialization information of the display cache and the flash memory, according to the requirement of the initialization information, the set top box begins to read binary data from a specified storage address of the local flash memory, and writes the read binary data into the display cache. In this way, a display screen of a video terminal (such as a television set) can display an image content corresponding to the binary data in the display cache. In the embodiment of the present invention, the display cache is a cache that presents a startup display file in the set top box to the user directly. For example, the Logo of the manufacturer of the set top box is stored in the display cache. The display cache displays the data in the display cache to the user without requiring startup of the operating system of the set top box, network authentication, and startup and loading of middleware and service menus. Once the set top box is initialized, the custom content can be displayed to the user directly. In the embodiment of the present invention, the custom content stored in the local flash memory is written into the display cache directly, which can reduce the time when the user waits for the startup of the operating system of the set top box, the network authentication, and the startup and loading of the middleware, and improve user experience.

In the embodiment of the present invention, if the locally stored custom content of the set top box is not in the preset file format, that is, if the locally stored custom content of the set top box cannot be directly identified by the display cache, the set top box directly reads the custom content into decoding hardware for decoding and then writes the decoded custom content into the display cache. For example, the preset file format is a BMP file format, and the file format of the locally stored custom content of the set top box is a Joint Photographic Experts Group (JPEG) file format, and therefore, the set top box reads the file of the JPG format into the decoding hardware, and the decoding hardware decodes the file of the JPG format into a file of the BMP format so that the file can be identified by the display cache. The decoding of the custom content performed by the decoding hardware is prior art, and is not detailed here in any further.

103. Control the custom content written into the display cache to be presented to a user on a video terminal.

In the embodiment of the present invention, after the custom content in the local flash memory is written into the display cache, the set top box controls the custom content written into the display cache to be presented to the user on the video terminal. For example, after an image advertisement stored by the network operator in the local flash memory of the set top box is written into the display cache, the set top box controls the picture advertisement and presents the picture advertisement in the display cache to the user on the video terminal.

104. After the custom content written into the display cache is controlled to be presented to the user on the video terminal, check a hardware device other than the display cache and the flash memory in the set top box, start an operating system of the set top box, and perform network authentication.

It should be noted that, in the embodiment of the present invention, the execution of steps 101 to 103 is that, after checking the display cache and the flash memory of the set top box, the set top box writes the custom content into the display cache so that the custom content in the local flash memory is presented to the user, which is different from the prior art where the custom content is presented to the user only after the initialization information of all hardware devices is read and after completion of the startup of the operating system, network authentication, and startup and loading of the middleware. It generally takes about 30 seconds to start up the operating system, perform the network authentication, and start up and load the middleware. Therefore, the method in the embodiment of the present invention avoids the delay of about 30 seconds in comparison with the prior art. Certainly, in the embodiment of the present invention, in step 104, after the custom content written into the display cache is controlled to be presented to the user on the video terminal, the set top box checks the hardware device other than the display cache and the flash memory, and begins to start up the operating system and perform network authentication. That is, in the embodiment of the present invention, the custom content can be controlled to be presented to the user on the video terminal, as long as the custom content in the flash memory is written into the display cache after the display cache and the flash memory of the set top box are checked.

It should be noted that, in the embodiment of the present invention, checking the hardware device other than the display cache and the flash memory of the set top box means checking whether the hardware devices, such as a network adapter, a conditional acceptance (CA) module, and a local flash memory of the set top box, are faulty. If such hardware devices are not faulty, the operating system of the set top box is started up, and then the network authentication is performed, and finally, the middleware is loaded, so that the entire startup process of the set top box is complete.

It should be noted that the custom content stored in the local flash memory may be updated through an idle channel while the set top box works normally. In the embodiment of the present invention, after the performing network authentication, the method further includes the following steps.

A1. Send a custom content update request to a network-side service server, where the custom content update request includes a serial number of the set top box, a user account, and file information of the custom content in the flash memory of the set top box.

A2. Obtain an updated custom content that is configured by the network-side service server according to the custom content update request.

A3. Write the updated custom content into the flash memory.

For step A1, after the set top box is started up, a custom content update request is sent to the network-side service server, where the custom content update request includes a serial number (ID, identity) of the set top box, a user account, and file information of the current locally stored custom content of the set top box, where the file information of the custom content includes information such as a file name, an address, and a format of the custom content.

For step A2, after receiving the custom content update request sent by the set top box, the network-side service server determines a user type and a user requirement according to the information such as the user account and the serial number of the set top box in the custom content update request, configures an updated custom content for the user, and returns to the set top box information such as an address of the matched updated custom content file and a protocol to obtain the file. The set top box may obtain the updated custom content configured for the user, and store it into a local temporary memory.

It should be noted that, for step A2, in practical application, a practicable implementation is that the set top box obtains, through an Internet Protocol (IP) path established between the set top box and the network-side service server, a uniform/universal resource locator (URL) of the updated custom content configured by the network-side service server, and, if the URL of the updated custom content is different from an URL of the custom content in the local flash memory, downloads the new custom content according to the URL of the updated custom content. An IP path is established between the set top box and the network-side service server, and the set top box can download the updated custom content through a Hyper Text Transfer Protocol (HTTP).

It should be noted that, for step A2, in practical application, another practicable implementation is selecting, from all custom contents that are broadcast by the network-side service server through a dedicated idle digital channel, a custom content that matches the custom content update request as the updated custom content. A dedicated idle digital channel is established between the set top box and the network side. The dedicated idle digital channel is exclusively used by the network-side service server to broadcast various custom contents to all set top boxes. According to a program type number, a program serial number, and a conditional acceptance serial number that are specified by a service system of the set top box, the set top box selects the updated custom content suitable for the set top box from all the custom contents broadcast by the network-side service server, and stores the updated custom content in the local temporary memory.

For step A3, after obtaining the updated custom content, the set top box writes the updated custom content into the flash memory. By calling an interface function provided by the set top box, the set top box can write the updated custom content in the local temporary memory into the local flash memory of the set top box, so that the set top box can present the updated custom content to the user when the set top box is started up next time.

It should be noted that, after completion of step A3, the following step may be performed: recording file information and update time of the updated custom content, for example, recording an update state of the custom content of the current set top box, including update time, an updated file name and URL, a local file storage location, an update success state, and so on.

In the embodiment of the present invention, after the set top box is powered on, the display cache and the flash memory of the set top box are checked. If the display cache and the flash memory of the set top box are checked correct, the custom content in the flash memory is written into the display cache, and the custom content written into the display cache is controlled to be presented to the user on the video terminal. Then the hardware device other than the display cache and the flash memory in the set top box is checked, the operating system of the set top box is started up, and network authentication is performed. In the embodiment of the present invention, after the display cache and the flash memory of the set top box are checked, the custom content is written into the display cache, and the custom content in the local flash memory is presented to the user. The custom content can be presented to the user through the display cache without waiting for self check of a hardware device other than the display cache and the flash memory, startup of the operating system, network authentication, and loading and startup of the middleware. Compared with the prior art, on the condition that the presentation time of the custom content is the same, the method in the embodiment of the present invention can avoid the delay of about 30 seconds, shorten the waiting time before the user can select a channel after power-on of the set top box, and improve user experience.

Figure 2:
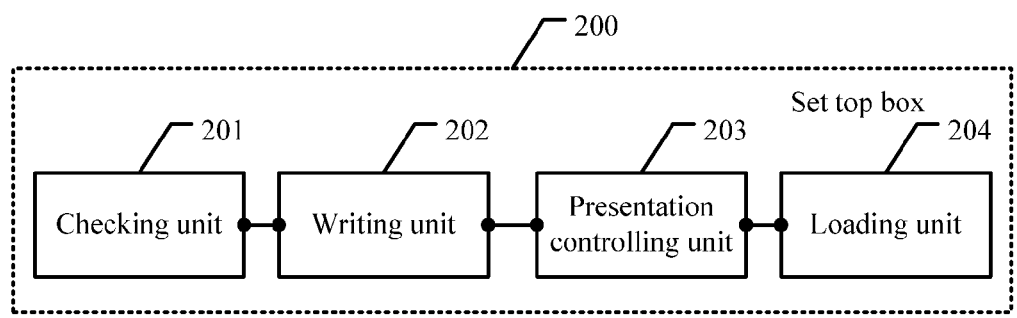
FIG. 2 is a schematic diagram of an embodiment of a set top box according to the present invention.

The above embodiment describes the method for presenting a custom content in a set top box according to the embodiment of the present invention. The following will describe a set top box that uses the method. As shown in FIG. 2, a set top box 200 provided in the embodiment of the present invention includes a checking unit 201, configured to check a display cache and a flash memory of a set top box after the set top box is powered on, a writing unit 202, configured to write the custom content in the flash memory into the display cache if the display cache and the flash memory of the set top box are checked correct, a presentation controlling unit 203, configured to control the custom content written into the display cache to be presented to a user on a video terminal, and a loading unit 204, configured to, after the custom content written into the display cache is controlled to be presented to the user on the video terminal, check a hardware device other than the display cache and the flash memory in the set top box, start an operating system of the set top box, and perform network authentication.

It should be noted that, for the writing unit 202 provided in the embodiment of the present invention, a practicable implementation is that the writing unit 202 may specifically include the following modules (not shown in FIG. 2): a determining module, configured to determine whether the custom content in the flash memory is in a preset file format, and, if yes, trigger a first processing module to operate, or, if not, trigger a second processing module and a decoding module to operate, the first processing module, configured to write the custom content into the display cache directly, the second processing module, configured to read the custom content into decoding hardware, the decoding module, configured to control the decoding hardware to decode the custom content, and the second processing module, configured to write the decoded custom content into the display cache.

It should be noted that, for the set top box 200 provided in the embodiment of the present invention, a practicable implementation is that the set top box 200 may further include the following units (not shown in FIG. 2): a request updating unit, configured to send a custom content update request to a network-side service server, where the custom content update request includes a serial number of the set top box, a user account, and file information of the custom content in the flash memory of the set top box, an obtaining unit, configured to obtain an updated custom content that is configured by the network-side service server according to the custom content update request, and a storing unit, configured to write the updated custom content into the flash memory.

For the obtaining unit, a practicable implementation is that the obtaining unit may be specifically configured to obtain, through an Internet Protocol IP path established between the set top box and the network-side service server, a uniform resource locator URL of the updated custom content configured by the network-side service server, and, if the URL of the updated custom content is different from an URL of the custom content in the flash memory, download the updated custom content according to the URL of the updated custom content.

For the obtaining unit, another practicable implementation is that the obtaining unit may be specifically configured to select, from all custom contents that are broadcast by the network-side service server through a dedicated idle digital channel, a custom content that matches the custom content update request as the updated custom content.

It should be noted that, for the set top box 200 provided in the embodiment of the present invention, another practicable implementation is that the set top box 200 may further include the following units (not shown in FIG. 2): a recording unit, configured to record file information and update time of the updated custom content of the set top box 200.

It should be noted that, as regards information exchange between modules/units of the foregoing apparatus and the execution processes thereof, because they are based on the same conception as the method embodiment of the present invention, they bring the same technical effect as the method embodiment of the present invention. Therefore, for details thereof, reference may be made to the description in the method embodiment shown in FIG. 1, and no repeated description is given herein any further.

In the embodiment of the present invention, after the set top box is powered on, the display cache and the flash memory of the set top box are checked. If the display cache and the flash memory of the set top box are checked correct, the custom content in the flash memory is written into the display cache, and the custom content written into the display cache is controlled to be presented to the user on the video terminal. Then the hardware device other than the display cache and the flash memory in the set top box is checked, the operating system of the set top box is started up, and network authentication is performed. In the embodiment of the present invention, after the display cache and the flash memory of the set top box are checked, the custom content is written into the display cache, and the custom content in the local flash memory is presented to the user. The custom content can be presented to the user through the display cache without waiting for self check of a hardware device other than the display cache and the flash memory, startup of the operating system, network authentication, and loading and startup of the middleware. Compared with the prior art, on the condition that the presentation time of the custom content is the same, the set top box in the embodiment of the present invention can reduce the delay by about 30 seconds, shorten the waiting time before the user can select a channel after power-on of the set top box, and improve user experience.

A person of ordinary skill in the art may understand that all or a part of the steps of the methods in the foregoing embodiments may be implemented by a program instructing relevant hardware. The program may be stored in a computer readable storage medium, such as a read-only memory, a magnetic disk, or an optical disk.

Detailed above are methods for presenting a custom content in a set top box and a set top box according to the present invention. A person of ordinary skill in the art can make modifications with respect to the specific implementation and the application scope according to the ideas of the embodiments of the present invention, and therefore, the content of the specification herein shall not be construed as a limitation to the present invention.

What is claimed is:

1. A method for presenting a custom content in a set top box, comprising:
   checking a display cache and a flash memory of the set top box after the set top box is powered on by performing a self test on the display cache and the flash memory, the self test including reading initialization information of the display cache and the flash memory;
   writing the custom content, which includes a display file and that is stored in the flash memory into the display cache in response to the checking the display cache and the flash memory indicating that the display cache and the flash memory are each configured normally;
   controlling the custom content written into the display cache so that the display file is presented to a user on a video terminal connected to the set top box;
   performing additional set top box start up after the display file is presented to the user on the video terminal, the additional set top box start up including checking another hardware device other than the display cache and the flash memory in the set top box by performing a self test on the another hardware device, starting an operating system of the set top box, and performing network authentication;
   sending a custom content update request to a network-side service server by the set top box, wherein the custom content update request comprises a serial number of the set to box, a user account, and file information of the custom content in the flash memory of the set top box;
   obtaining, by the set to box in response to the custom content update request, an updated custom content that is configured by the network-side service server according to the custom content update request, the updating the custom content comprising:
      obtaining, through an Internet Protocol (IP) path established between the set top box and the network-side service server, a uniform resource locator (URL) of the updated custom content configured by the network-side service server; and
      downloading the updated custom content according to the URL of the updated custom content in response to the URL of the updated custom content is different from an URL of the custom content in the flash memory; and
   writing the updated custom content into the flash memory.

2. The method for presenting the custom content in the set top box according to claim 1, wherein the writing the custom content in the flash memory into the display cache comprises:
   determining whether the display file of the custom content in the flash memory is in a preset file format;
   writing the custom content into the display cache directly in response to determining that the display file is in the preset file format; and
   reading the custom content into decoding hardware so that the decoding hardware decodes the custom content in response to determining that the display file is not in the preset file format, and writing the decoded custom content into the display cache.

3. The method for presenting the custom content in the set top box according to claim 1, wherein the obtaining the updated custom content that is configured by the network-side service server according to the custom content update request comprises:
   selecting, from all custom contents that are broadcast by the network-side service server through a dedicated idle digital channel, a custom content that matches the custom content update request as the updated custom content.

4. The method for presenting the custom content in the set top box according to claim 1, wherein the method further comprises:
   recording file information and update time of the updated custom content after the writing the updated custom content into the flash memory.

5. A set top box, comprising:
   a display cache;
   a flash memory;

a processor connected to the flash memory and to the display cache;

a non-transitory computer readable medium connected to the processor and storing a program to be executed by the processor, the program including instructions to:

check the display cache and the flash memory after the set top box is powered on by performing a self test on the display cache and the flash memory, the self test including reading initialization information of the display cache and the flash memory;

write custom content that includes a display file and that is stored in the flash memory into the display cache in response to the check of the display cache and the flash memory indicating that the display cache and the flash memory are each configured normally;

control the custom content written into the display cache so that the display file is presented to a user on a video terminal connected to the set top box; and performing additional set top box start up after the display file is presented to the user on the video terminal, the additional set top box start up including checking another hardware device other than the display cache and the flash memory by perming a self test on the another hardware device, starting an operating system of the set top box, and performing network authentication;

send a custom content update request to a network-side service server, wherein the custom content update request comprises a serial number of the set top box, a user account, and file information of the custom content in the flash memory of the set top box;

obtain an updated custom content that is configured by the network-side service server according to the custom content update request, wherein the instructions to obtain the updated custom content comprise instructions to:

obtain, through an Internet Protocol IP path established between the set top box and the network-side service server, a uniform resource locator URL of the updated custom content configured by the network-side service server; and download the updated custom content according to the URL of the updated custom content in response to the URL of the updated custom content being different from an URL of the custom content in the flash memory; and write the updated custom content into the flash memory.

6. The set top box according to claim 5, wherein the instruction to write the custom content into the display cache comprises instructions to:

determine whether the custom content in the flash memory is in a preset file format;

write the custom content into the display cache directly in response to determining that the display file is in the preset file format;

read the custom content into decoding hardware in response to determining that the display file is in the preset file format;

cause the decoding hardware to decode the custom content; and write the decoded custom content into the display cache.

7. The set top box according to claim 5, wherein the instructions to obtain the updated custom content comprise instructions to select, from all custom contents that are broadcast by the network-side service server through a dedicated idle digital channel, a selected custom content that matches the custom content update request as the updated custom content.

8. The set top box according to claim 5, wherein instructions further comprise instructions to:

record file information and update time of the updated custom content.

\* \* \* \* \*